United States Patent
Roman

Patent Number: 5,816,442
Date of Patent: Oct. 6, 1998

[54] APPARATUS FOR USE IN SORTING GRANULAR MATERIALS

[76] Inventor: Robert Merlin Roman, #5 England Crescent, Yellowknife, North West Territories, Canada, X1A 3N5

[21] Appl. No.: 568,648

[22] Filed: Dec. 7, 1995

[51] Int. Cl.⁶ .................................................. B65H 3/60
[52] U.S. Cl. ........................................ 221/200; 222/196
[58] Field of Search .................... 209/479, 245, 209/246, 243, 247, 910, 920, 254; 221/174, 200; 222/196, 199, 509

[56] References Cited

U.S. PATENT DOCUMENTS 4,472,091  9/1984  Callahan ................................ 222/196

FOREIGN PATENT DOCUMENTS

| | | | |
|---|---|---|---|
| 2263876 | 12/1972 | Germany ................................ | 222/196 |
| 899655 | 1/1982 | U.S.S.R. . | |
| 1200127 | 12/1985 | U.S.S.R. . | |
| 1416394 | 8/1988 | U.S.S.R. . | |
| 851391 | 10/1960 | United Kingdom ................... | 222/196 |

OTHER PUBLICATIONS

Syntron Link–Belt Catalogue printed in 1993 by FMC Corporation, pp. 19, 20, 21, 22, 151, 152, 153, 154, 155 and 158.

*Primary Examiner*—Kenneth Noland
*Attorney, Agent, or Firm*—Anthony R. Lambert

[57] ABSTRACT

An apparatus for use in sorting granular materials which includes a bin having an outlet. A conveyor is disposed beneath the outlet of the bin. A pin is provided having a first end and a second end. The first end is affixed to the conveyor. The second end extends into the outlet of the bin. A motor is used to vibrate the conveyor. The pin vibrates in the outlet of the bin as the conveyor vibrates, thereby promoting a flow of granular material from the bin onto the conveyor in direct proportion to the rate of vibration of the conveyor.

9 Claims, 5 Drawing Sheets

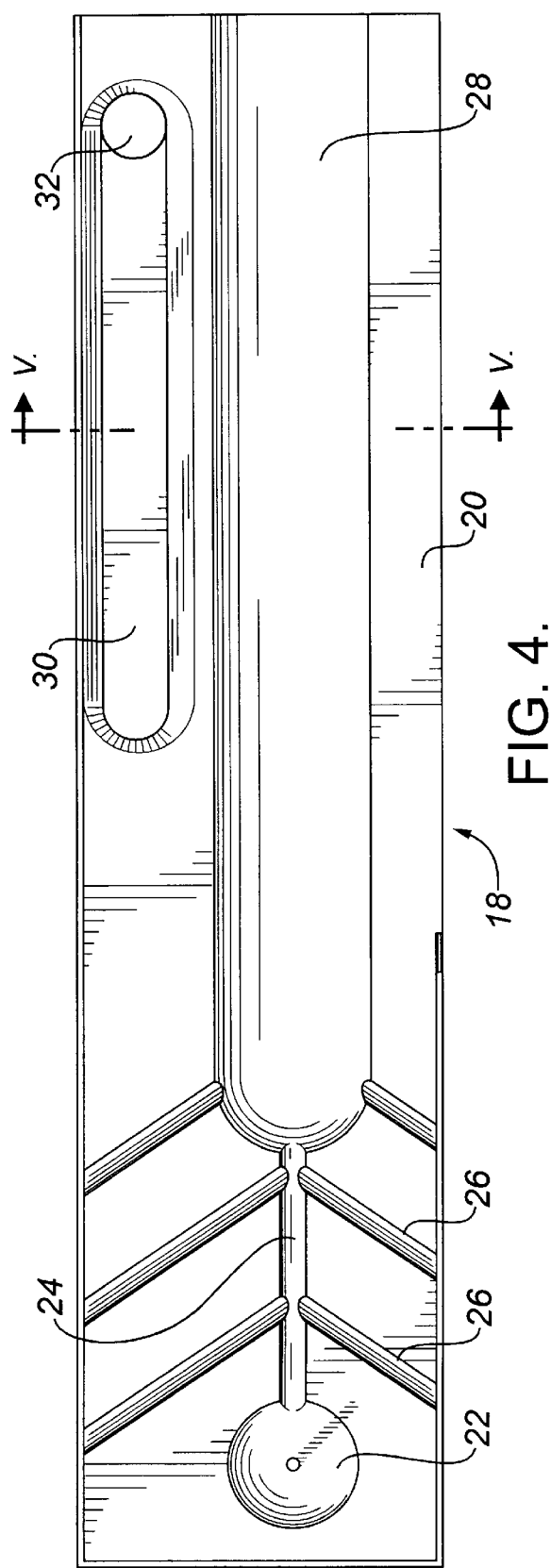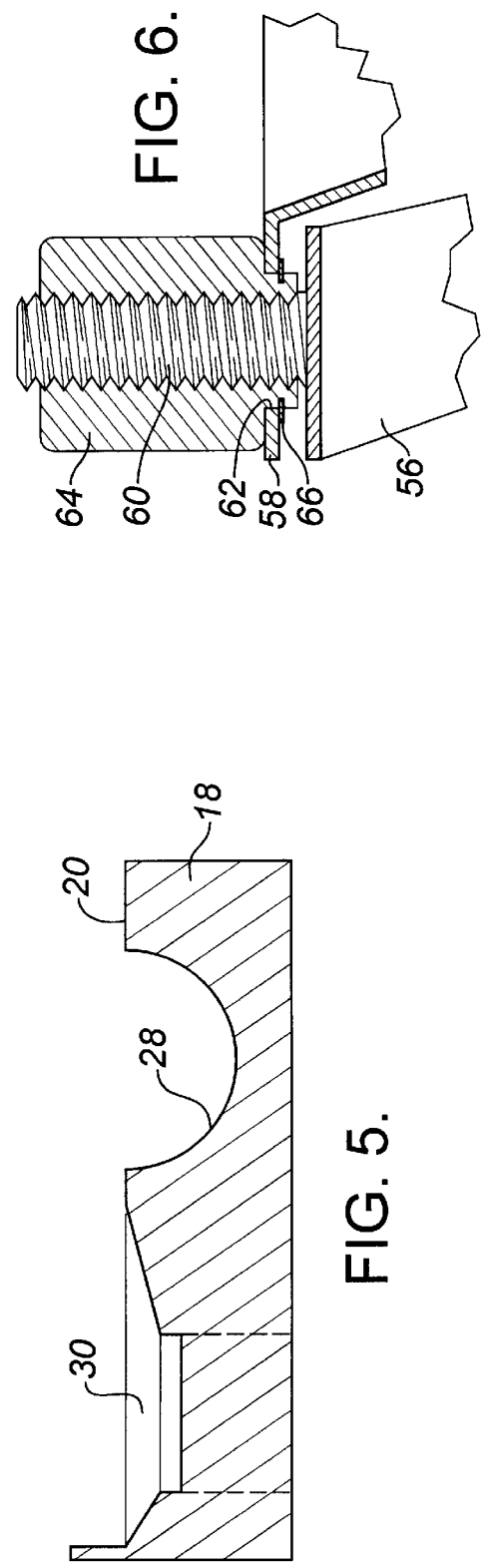

APPARATUS FOR USE IN SORTING GRANULAR MATERIALS

FIELD OF THE INVENTION

The present invention relates to an apparatus for use in sorting granular materials and, in particular, for use in separating miniature diamonds from granular concentrates.

BACKGROUND OF THE INVENTION

The process of mining for diamonds requires a number of stages in order to separate diamonds from diamond bearing ore. The ore is crushed down to 2 inch size, then washed. The crushed material is introduced into a slurry of ferrous silicone and water, which has a specific gravity of between 2.8 and 3.1. Any pieces which have a similar specific gravity are captured within the slurry and are carried away, where they are separated out and become concentrate. Material which is not captured in the slurry is sent to the re-crusher where it is again reduced in size. From the re-crusher, the material is again introduced to the slurry and the process is repeated over and over until the rejected material is reduced to less than 1 mm. in size. The rejected material of less then 1 mm. are disposed of as tailings. The concentrates, which vary is size from 25 mm. to 1 mm. are washed, dried and screened into size ranges of 1–2 mm., 2–4 mm., 4–8 mm, and over 8 mm. The concentrates contain not only diamonds, but also calcite, mica, pyrope, garnets, chrome diopside, olivine, etc. A number of these materials look similar to diamonds. In the smaller size ranges, one must use a microscope to sort the concentrates as they are difficult to recognize by the naked eye. The apparatus used for such examination includes of a vibrating conveyor that slowly moves granular material past the microscope and a feed bin from which granular material is fed onto the vibrating conveyor.

The granular materials tend to bridge or clog as they converge toward the restricted openings of feed bins. As the material moves toward the opening, it is moving slowly into a restricted space. The movement of the materials causes the pieces to find the tightest possible position to nest against the surrounding pieces. The weight of the material above, and the nesting tendency causes the material to form a very tight layer just above and at the openings. In order to allow more time to examine materials, operators frequently stop the conveyors which carry the granular materials. These stop-start cycles are particularly prone to bridging or clogging occurring. In order to prevent clogging bin vibrators are employed. Even with the use of bin vibrators, difficulties are commonly experienced in obtaining a consistent outflow of granular material from the feed bin and coordinating that outflow with the rate at which the granular material is moved along the conveyor. If not closely regulated bin vibrators can contribute to clogging by compacting or densifying the granular material.

SUMMARY OF THE INVENTION

What is required is an apparatus that will provide a consistent outflow of granular material from the feed bin and coordinate that outflow with the rate at which the granular material is moved along the conveyor.

According to the present invention there is provided an apparatus for use in sorting granular materials which includes a bin having an outlet. A conveyor is disposed beneath the outlet of the bin. A pin is provided having a first end and a second end. The first end is affixed to the conveyor. The second end extends into the outlet of the bin. Means is provided for vibrating the conveyor. The pin vibrates in the outlet of the bin as the conveyor vibrates, thereby promoting a flow of granular material from the bin onto the conveyor in direct proportion to the rate of vibration of the conveyor.

The apparatus, as described above, has proven to be ideal for use in separating diamonds from diamond bearing concentrates. The rate of vibration of the conveyor is adjusted to provide a slow and consistent flow past a microscope. The pin, being mounted to the conveyor, vibrates within the outlet of the bin at the same rate as the conveyor. This eliminates bridging in the bin and provides a consist flow of granular material from the bin onto the conveyor which is in direct proportion to the rate of vibration of the conveyor. The necessary relationship between the pin and the outlet of the bin is easiest to maintain when the outlet has a substantially vertical orientation.

Although beneficial results may be obtained through the use of the apparatus, as described above, there are further refinements which can be added that virtually eliminate bridging or clogging. Even more beneficial results may, therefore, be obtained when the outlet is positioned at a lowest and narrowest extremity of the bin, the extremity of the bin in which the outlet is positioned being flexible.

Although beneficial results may be obtained through the use of the apparatus, as described above, there are refinements that can be added that guard against excess flow. Even more beneficial results may, therefore, be obtained when the outlet is positioned at a lowest and narrowest extremity of the bin, the extremity being flexible. The flexible extremity of the bin cooperates with the pin to eliminate bridging and clogging. It also minimizes harmonic noise transfer from the pin to the bin. It is preferred that the flow of granular material be directed into a recess in the top surface of the conveyor, as with this configuration granular material will only tend to flow from the outlet to the extent that space within the recess permits.

Although beneficial results may be obtained through the use of the apparatus, as described above, a microscope has a relatively narrow focus area. It is difficult, therefore, to examine the granular material under a microscope when it is dispersed too widely over the surface of the conveyor. Even more beneficial results may, therefore, be obtained when the conveyor has a top surface with a longitudinally extending trough. It is preferred that the bottom of the longitudinally extending trough be slightly rounded to help centre the flow of granular material in the microscopes focus area.

Although beneficial results may be obtained through the use of the apparatus, as described above, it is unavoidable that some granular material will scatter across the top surface of the conveyor instead of passing along the longitudinally extending trough as intended. Even more beneficial effects may, therefore, be obtained when the top surface of the conveyor has a plurality of transversely extending tributary troughs that connect with the longitudinally extending trough.

Although beneficial results may be obtained through the use of the apparatus, as described above, as diamonds are spotted they must be quickly separated from the rest of the granular concentrates. Even more beneficial results may, therefore, be obtained when the top surface of the conveyor has a recessed collection tray. Upon spotting a miniature diamond, a person operating the apparatus pushes the diamond out of the longitudinally extending trough into the collection tray.

BRIEF DESCRIPTION OF THE DRAWINGS

These and other features of the invention will become more apparent from the following description in which reference is made to the appended drawings, wherein:

FIG. 4 is a top plan view of a conveyor illustrated in FIG. 2.

FIG. 5 is an end elevation view in section taken along section lines V—V of FIG. 4.

FIG. 6 is a detailed view taken at VI of FIG. 3.

DETAILED DESCRIPTION OF THE PREFERRED EMBODIMENT

Figure 1:
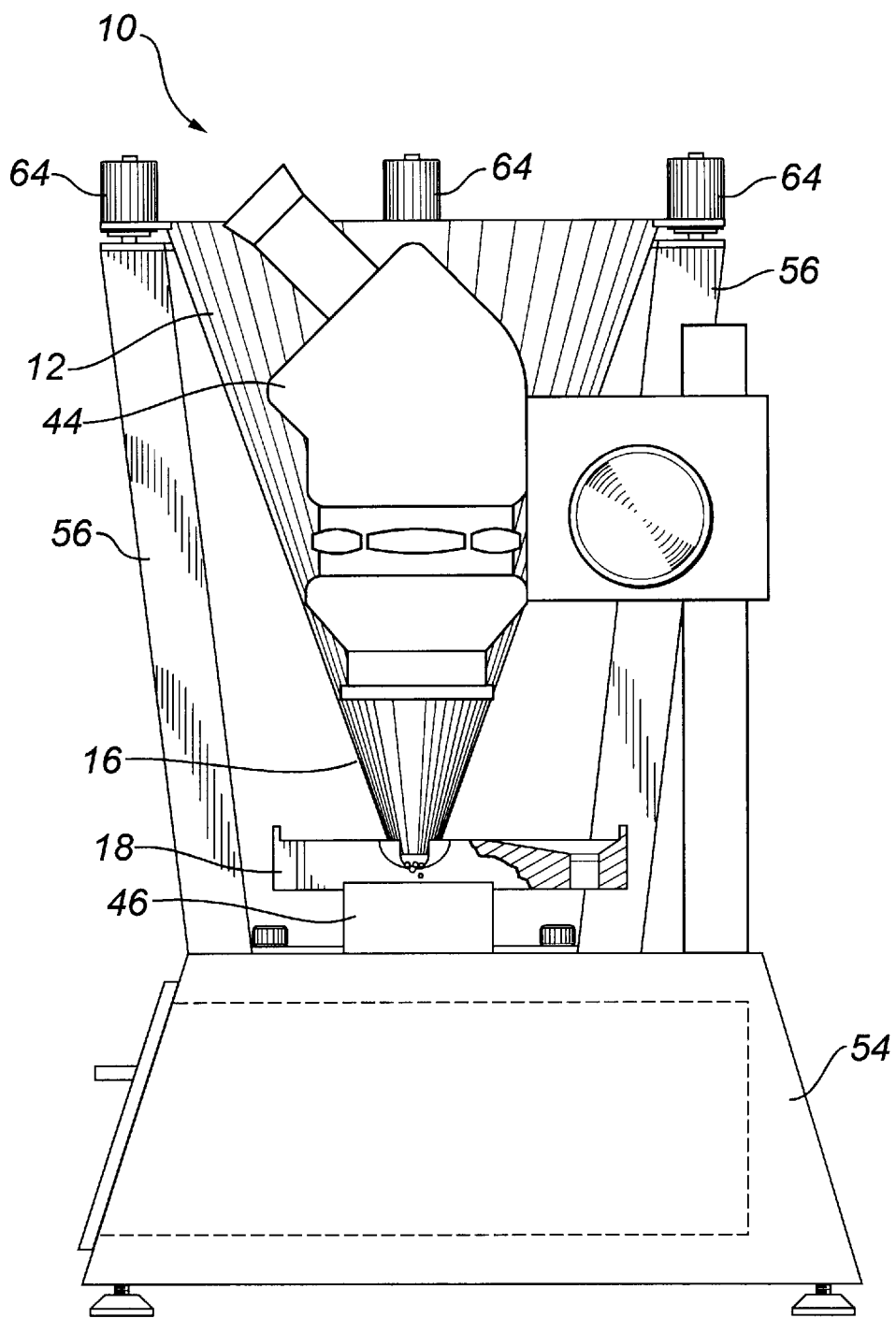
FIG. 1 is an end elevation view of an apparatus for use in sorting granular materials constructed in accordance with the teachings of the present invention.

The preferred embodiment, an apparatus for use in sorting granular materials generally identified by reference numeral 10, will now be described with reference to FIGS. 1 through 6.

Figure 2:
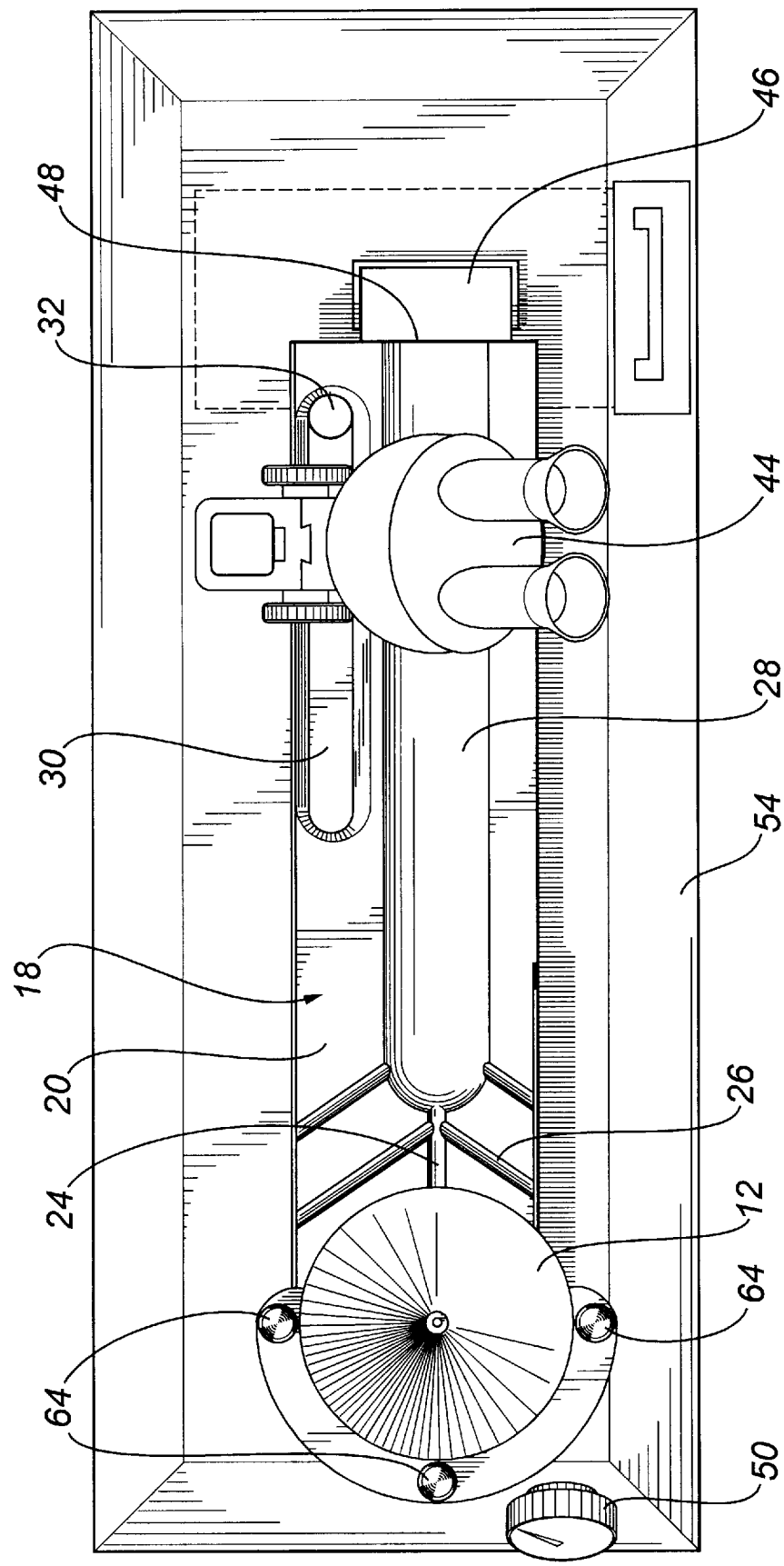
FIG. 2 is a top plan view of the apparatus for use in sorting granular materials illustrated in FIG. 1.
Figure 3:
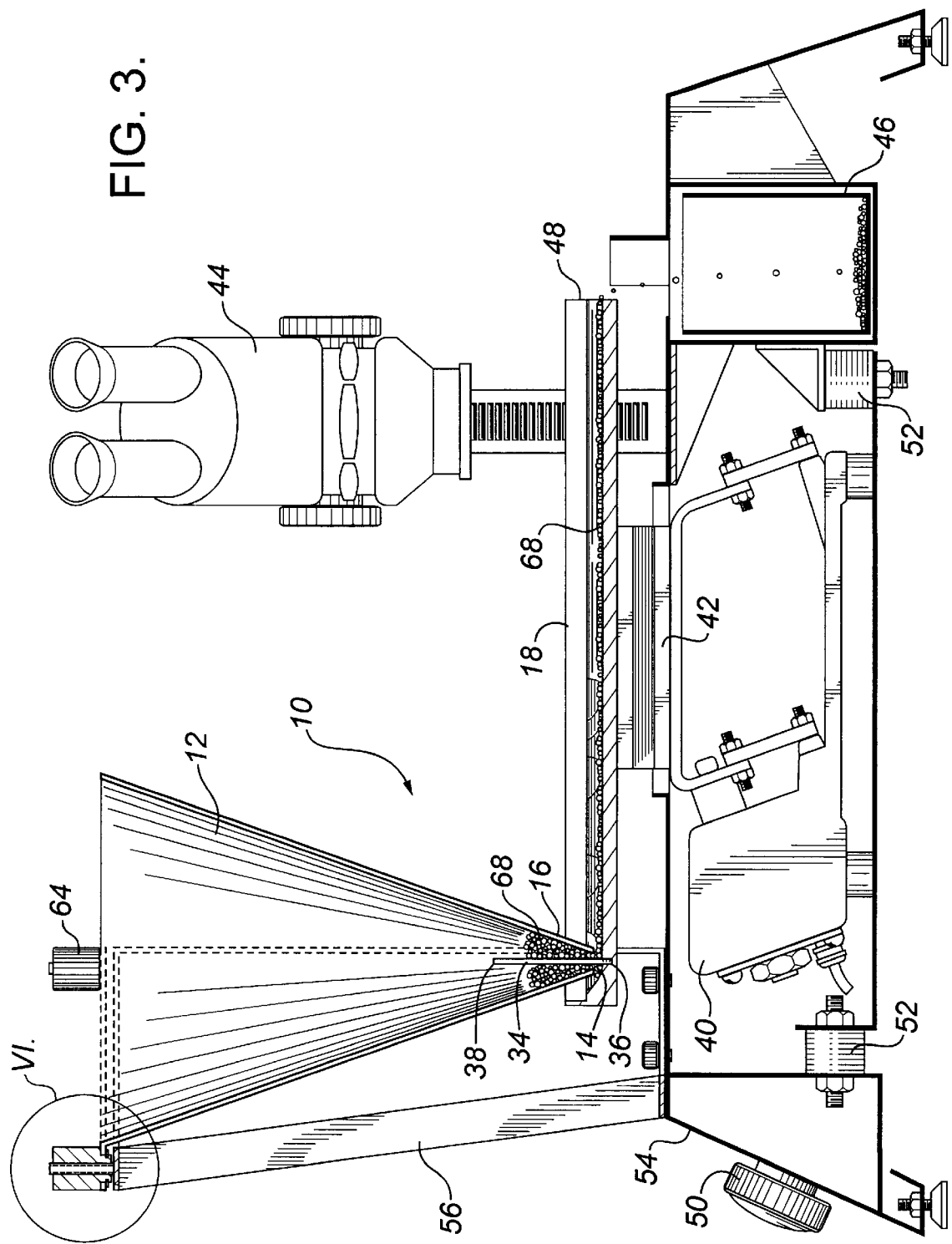
FIG. 3 is a side elevation view in longitudinal section of the apparatus for use in sorting granular materials illustrated in FIG. 1.
Figure 7:
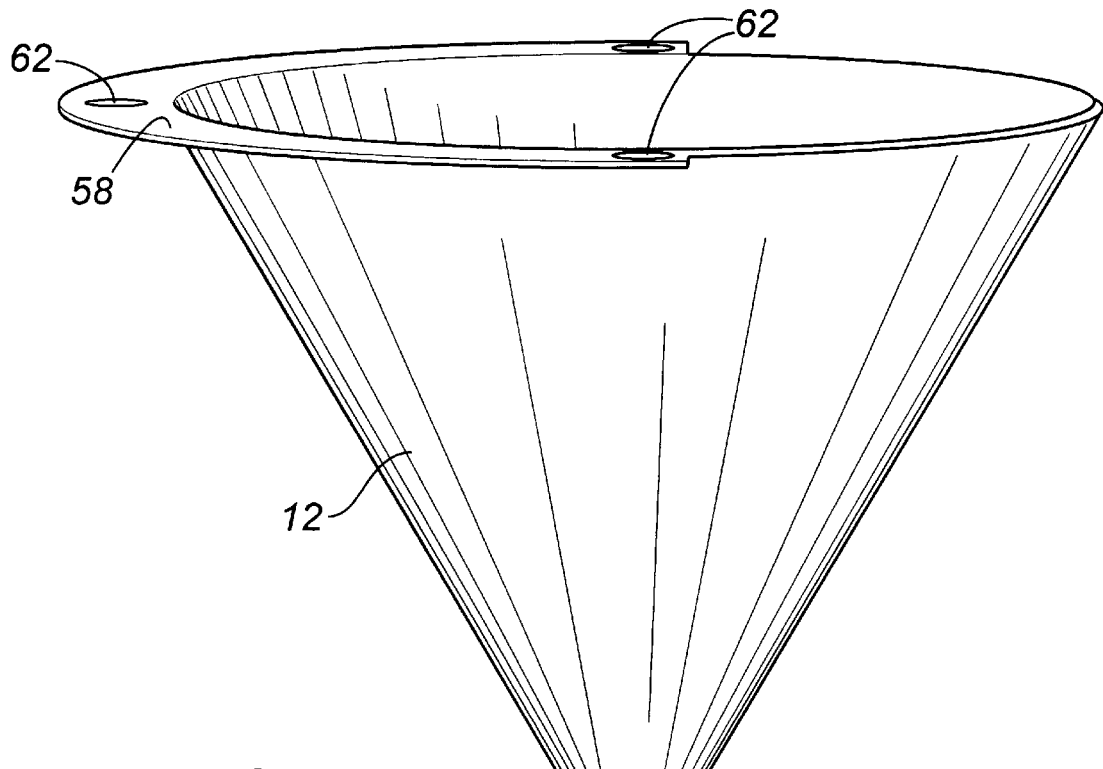
FIG. 7 is a side elevation view, partially in section, of a preferred form of bin having a flexible lower extremity.

Referring to FIG. 3, apparatus 10 includes a bin 12 in the shape of an inverted cone. A substantially vertically oriented outlet 14 is positioned at a lowest and narrowest extremity 16 of bin 12. Referring to FIG. 7, the lowest and narrowest extremity 16 of bin 12 is made of a flexible material in a tubular configuration. A conveyor 18 is disposed beneath outlet 14 of bin 12. Referring to FIG. 4, conveyor 18 has a top surface 20 with a generally circular recess 22. Referring to FIG. 3, lowest and narrowest extremity 16 of bin 12 is disposed over circular recess 22. Referring to FIG. 7, the internal diameter of the flexible extremity 16 of bin 12 is roughly the same as the diameter of circular recess 22. Only a slight air gap is left between flexible extremity 16 and top surface 20 of conveyor 18. Referring to FIG. 4, top surface 20 also has a longitudinally extending trough 24 that communicates with circular recess 22. A plurality of transversely extending tributary troughs 26 are arranged in a herring bone configuration and connect with longitudinally extending trough 24. Longitudinally extending trough 24 converges into or becomes an enlarged semi-circular longitudinally extending channel 28. Top surface 20 also has a recessed collection tray 30 positioned parallel to longitudinally extending channel 28. Collection tray 30 has an outlet 32. Referring to FIG. 3, a pin 34 is provided having a first end 36 and a second end 38. First end 36 is affixed in a substantially central position within circular recess 22 in top surface 20 of conveyor 18. Second end 38 is substantially axially aligned with and extends into flexible extremity 16 of bin 12. Referring to FIG. 7, it should be noted that it is preferred that second end 38 of pin 34 not extend farther into bin 12 past flexible extremity 16. A vibrator motor 40 is coupled by a frame assembly 42 to conveyor 18. Apparatus 10, being configured for use in separating diamonds from granular concentrates has a number of further features that will now be described. A microscope 44 is positioned above longitudinally extending channel 28, as illustrated in FIGS. 1 through 3. Referring to FIG. 3, a disposal container 46 is positioned beneath a remote end 48 of conveyor 18 in which granular material is accumulated for disposal. A control knob 50 is provided which is used as means for varying the rate of vibration generated by vibrator motor 40. A plurality of shock absorbing elements 52 are used to insulate a main support frame 54 from the vibrations generated by vibrator motor 40. Bin 12 is not intended to be vibrated, and is accordingly mounted to main support frame 54. The means for mounting bin 12 include three support members 56. Support members 56 attach to a semi-circular mounting flange 58 on bin 12. Referring to FIG. 6, each of support members 56 has an upwardly extending threaded portion 60. Semi-circular mounting flange 58 of bin 12 has a plurality of mounting apertures 62 and an associated hand adjustable nut 64 that is secured in aperture 62 by means of a snap ring 66. This configuration provides a means of adjusting the air gap between extremity 16 of bin 12 and top surface 20 of conveyor 18.

The use and operation of apparatus 10 will now be described with reference to FIGS. 1 through 6. Bin 12 is lowered by turning hand adjustable nuts 64 until the air gap between outlet 14 located on flexible extremity 16 of bin 12 and top surface 20 of conveyor 18 is equal to approximately one half the diameter of the smallest size of granular material 68. Granular material 68 is then placed into bin 12, which results in circular recess 22 filling with granular material 68. Vibrator motor 40 is then activated to vibrate conveyor 18. As conveyor 18 vibrates, granular material 68 slowly migrates from circular recess 22 and along longitudinally extending trough 24. When longitudinally extending trough 24 expands to form longitudinally extending channel 28, granular material 68 spreads out so that individual grains are visible as granular material 68 passes under microscope 44. Referring to FIG. 5, when a miniature diamond is spotted it is pushed using a pair of tweezers or the like from longitudinally extending channel 28 into adjacent collection tray 30. As conveyor 18 continues to vibrate, granular material 68 continues to migrate until it reaches remote end 48 at which point it falls by gravity from conveyor 18 into disposal container 46. Recovered diamonds similarly migrate along collection tray 30 to outlet 32 where they fall by force of gravity through outlet 32 into a collection container (not shown). Pin 34 vibrates in outlet 14 at flexible extremity 16 of bin 12 as conveyor 18 vibrates. This eliminates bridging and clogging and promotes a flow of granular material 68 from bin 12 in direct proportion to the rate of vibration of conveyor 18. If a faster processing stream of granular material 68 is desired this can be accomplished by turning control knob 50 for vibrator motor 40 to a higher speed to increase the flow rate. As the flow rate increases, granular material 68 will not only exit circular recess 22 by means of longitudinally extending trough 24, but will tend to overflow to at least some extent circular recess 22. When this overflow occurs, the herring bone configuration of transversely extending tributary troughs 26 leads to granular material 68 being channelled back into longitudinally extending trough 24.

It will be apparent to one skilled in that art the manner in which apparatus 10 achieves a slow and controlled consistent migration of granular material 68 so as to enable manual separation to be performed. It will also be apparent to one skilled in the art the manner in which the flow of granular material 68 exiting outlet 14 of bin 12 is coordinated with the rate at which granular material 68 is moved along conveyor 18. It will further be apparent the teachings of the present invention are not limited to the mining industry, but are capable of being applied to apparatus developed for a variety of other quality control, sorting, examining, or counting applications. It will finally be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus for use in sorting granular materials, comprising:

a bin having an outlet;

a conveyor disposed beneath the outlet of the bin;

a pin having a first end and a second end, the first end being affixed to the conveyor and the second end extending into the outlet of the bin;

means for vibrating the conveyor, the pin vibrating in the outlet of the bin as the conveyor vibrates, thereby promoting a flow of granular material from the bin onto the conveyor in direct proportion to the rate of vibration of the conveyor.

2. The apparatus as defined in claim 1, wherein the outlet has a substantially vertical orientation.

3. The apparatus as defined in claim 1, wherein the outlet is positioned at a lowest and narrowest extremity of the bin, the extremity of the bin in which the outlet is positioned being flexible.

4. The apparatus as defined in claim 3, wherein the lowest and narrowest extremity of the bin is disposed over a recess in a top surface of the conveyor.

5. The apparatus as defined in claim 1, wherein the conveyor has a top surface with a longitudinally extending trough.

6. The apparatus as defined in claim 5, wherein the top surface of the conveyor has a plurality of transversely extending tributary troughs that connect with the longitudinally extending trough.

7. The apparatus as defined in claim 1, wherein a top surface of the conveyor has a recessed collection tray.

8. An apparatus for use in sorting granular materials, comprising:

a bin having a substantially vertically oriented outlet positioned at a lowest and narrowest extremity of the bin, the extremity being flexible;

a conveyor disposed beneath the outlet of the bin, the conveyor having top surface with a recess over which is disposed the lowest and narrowest extremity of the bin, the top surface having a longitudinally extending trough that communicates with the circular recess, the top surface of the conveyor having a recessed collection tray;

a pin having a first end and a second end, the first end being affixed in a substantially central position within the recess in the top surface of the conveyor and the second end extending into the outlet of the bin;

a vibrator motor coupled to the conveyor, the vibrator motor vibrating the conveyor, the pin vibrating in the outlet of the bin as the conveyor vibrates, thereby promoting a flow of granular material from the bin onto the conveyor in direct proportion to the rate of vibration of the conveyor.

9. An apparatus for use in sorting granular materials, comprising:

a bin in the shape of an inverted cone having a substantially vertically oriented outlet positioned at a lowest and narrowest extremity of the bin, the lowest and narrowest extremity being a flexible tube;

a conveyor disposed beneath the outlet of the bin, the conveyor having top surface with a generally circular recess over which is disposed the lowest and narrowest extremity of the bin, the top surface having a longitudinally extending trough that communicates with the circular recess, a plurality of transversely extending tributary troughs arranged in a herring bone configuration connecting with the longitudinally extending trough, the longitudinally extending trough converging into an enlarged longitudinally extending channel, the top surface of the conveyor having a recessed collection tray positioned parallel to the longitudinally extending channel, the collection tray having an outlet;

a pin having a first end and a second end, the first end being affixed in a substantially central position within the circular recess in the top surface of the conveyor and the second end being substantially axially aligned with and extending into the outlet of the bin;

a vibrator motor coupled to the conveyor, the vibrator motor vibrating the conveyor, the pin vibrating in the outlet of the bin as the conveyor vibrates, thereby promoting a flow of granular material from the bin onto the conveyor in direct proportion to the rate of vibration of the conveyor.

* * * * *